US010491635B2

(12) United States Patent
Arumugam (10) Patent No.: US 10,491,635 B2
(45) Date of Patent: Nov. 26, 2019

(54) ACCESS POLICIES BASED ON HDFS EXTENDED ATTRIBUTES

(71) Applicant: BlueTalon, Inc., Redwood City, CA (US)

(72) Inventor: Dilli Dorai Minnal Arumugam, Campbell, CA (US)

(73) Assignee: BlueTalon, Inc., Redwood, CA (US)

( * ) Notice: Subject to any disclaimer, the term of this patent is extended or adjusted under 35 U.S.C. 154(b) by 245 days.

(21) Appl. No.: 15/640,248

(22) Filed: Jun. 30, 2017

(65) Prior Publication Data

US 2019/0007457 A1    Jan. 3, 2019

(51) Int. Cl.
*H04L 29/06* (2006.01)
*G06F 21/62* (2013.01)
*G06F 16/182* (2019.01)

(52) U.S. Cl.
CPC ............ *H04L 63/20* (2013.01); *G06F 16/182* (2019.01); *G06F 21/6218* (2013.01); *H04L 63/08* (2013.01)

(58) Field of Classification Search
CPC .... G06F 16/182; G06F 21/62; G06F 21/6218; H04L 63/08; H04L 63/20
See application file for complete search history.

(56) References Cited

U.S. PATENT DOCUMENTS

| | | | |
|---|---|---|---|
| 5,537,548 A | 7/1996 | Fin | |
| 6,226,372 B1 | 5/2001 | Beebe | |
| 6,463,470 B1 | 10/2002 | Mohaban | |
| 6,678,828 B1 * | 1/2004 | Pham | G06F 3/0622 726/2 |
| 6,687,229 B1 | 2/2004 | Kataria | |
| 6,766,457 B1 * | 7/2004 | Baisley | G06F 21/6218 707/999.009 |
| 7,542,943 B2 | 6/2009 | Caplan | |
| 7,568,097 B2 * | 7/2009 | Burnett | G06F 21/6218 713/165 |
| 7,631,084 B2 | 12/2009 | Thomas | |

(Continued)

FOREIGN PATENT DOCUMENTS

WO    WO 2014/207554    12/2014

OTHER PUBLICATIONS

Apache, Extended Attributes in HDFS, Apr. 2016, https://hadoop.apache.org/docs/stable/hadoop-project-dist/hadoop-hdfs/ExtendedAttributes.html (Year: 2016).*

(Continued)

*Primary Examiner* — Khang Do
(74) *Attorney, Agent, or Firm* — Fiala & Weaver P.L.L.C.

(57) ABSTRACT

Systems, computer program products and methods implementing access control on a distributed file system are described. A policy engine enforces one or more policies to access a data item stored in the distributed file system by utilizing non-system extended attributes of the data item. The policy engine receives, from a client device, a request to access the data item. The policy engine determines a policy for access the data item. The policy specifies one or more conditions for accessing the data item in one or more extended attributes. The one or more extended attributes are associated with the data item in the distributed file system. The policy determines whether to grant the request to access the data item according to values of the one or more extended attributes.

20 Claims, 3 Drawing Sheets

(56) References Cited

U.S. PATENT DOCUMENTS

| | | |
|---|---|---|
| 7,730,089 B2 | 6/2010 | Campbell |
| 8,181,221 B2 | 5/2012 | Manickam et al. |
| 8,196,183 B2 | 6/2012 | Smith |
| 8,230,484 B1 * | 7/2012 | Wiese .................. H04L 63/104 726/27 |
| 8,239,954 B2 * | 8/2012 | Wobber ............... H04L 63/101 726/26 |
| 8,613,108 B1 | 12/2013 | Aggarwal |
| 8,677,447 B1 | 3/2014 | Zuk et al. |
| 8,683,560 B1 | 3/2014 | Brooker |
| 9,038,168 B2 * | 5/2015 | Ben-Zvi ............. G06F 21/6218 380/277 |
| 9,071,594 B2 | 6/2015 | Boulos et al. |
| 9,614,715 B2 | 4/2017 | Bhave |
| 9,866,592 B2 | 1/2018 | Arumugam et al. |
| 9,871,825 B2 | 1/2018 | Arumugam et al. |
| 2001/0023486 A1 | 9/2001 | Kayashima |
| 2002/0007404 A1 | 1/2002 | Vange |
| 2002/0019828 A1 | 2/2002 | Mortl |
| 2002/0169907 A1 | 11/2002 | Candea |
| 2003/0018786 A1 | 1/2003 | Lortz |
| 2003/0021283 A1 | 1/2003 | See |
| 2003/0046315 A1 | 3/2003 | Feig |
| 2003/0115322 A1 | 6/2003 | Moriconi |
| 2004/0054791 A1 | 3/2004 | Chakraborty |
| 2004/0073668 A1 | 4/2004 | Bhat |
| 2004/0088560 A1 | 5/2004 | Danks |
| 2004/0128394 A1 | 7/2004 | Knauerhase |
| 2004/0267749 A1 | 12/2004 | Bhat |
| 2005/0021978 A1 | 1/2005 | Bhat |
| 2006/0053216 A1 | 3/2006 | Deokar |
| 2006/0218150 A1 * | 9/2006 | Janakiraman .......... G06F 16/10 |
| 2007/0124797 A1 | 5/2007 | Gupta |
| 2007/0156659 A1 | 7/2007 | Lim |
| 2007/0174831 A1 | 7/2007 | Lee |
| 2007/0234408 A1 | 10/2007 | Burch |
| 2008/0301437 A1 | 12/2008 | Chevalier |
| 2009/0049512 A1 | 2/2009 | Manickam et al. |
| 2010/0024019 A1 | 1/2010 | Backlund |
| 2010/0064341 A1 | 3/2010 | Aldera |
| 2010/0281524 A1 | 11/2010 | Ghittino |
| 2011/0209194 A1 | 8/2011 | Kennedy |
| 2012/0030242 A1 * | 2/2012 | Nakamura .......... G06F 21/6218 707/781 |
| 2012/0110632 A1 | 5/2012 | Burghart |
| 2012/0131164 A1 | 5/2012 | Bryan |
| 2012/0198467 A1 | 8/2012 | Jackson |
| 2013/0117313 A1 | 5/2013 | Miao |
| 2013/0332982 A1 | 12/2013 | Rao et al. |
| 2014/0012833 A1 | 1/2014 | Humprecht et al. |
| 2014/0068699 A1 | 3/2014 | Balacheff |
| 2014/0090085 A1 | 3/2014 | Mattsson et al. |
| 2014/0128053 A1 | 5/2014 | Merchant |
| 2014/0165134 A1 | 6/2014 | Goldschlag |
| 2014/0229596 A1 | 8/2014 | Burke |
| 2014/0351573 A1 | 11/2014 | Martini |
| 2015/0067881 A1 | 3/2015 | Badstieber et al. |
| 2015/0088935 A1 | 3/2015 | French et al. |
| 2015/0113010 A1 | 4/2015 | Muthyala et al. |
| 2015/0128205 A1 | 5/2015 | Mahaffey |
| 2015/0381660 A1 | 12/2015 | Hsiung |
| 2016/0098573 A1 | 4/2016 | Yankovskiy |
| 2016/0149859 A1 | 5/2016 | Curtis |
| 2016/0269251 A1 * | 9/2016 | Hassan ............... H04L 41/5054 |
| 2016/0277373 A1 * | 9/2016 | Murray ................ H04L 63/061 |
| 2016/0277377 A1 | 9/2016 | March |
| 2016/0342803 A1 | 11/2016 | Goodridge |
| 2017/0012962 A1 | 1/2017 | Lissack |
| 2017/0053130 A1 * | 2/2017 | Hughes ............... G06F 21/6227 |
| 2017/0093925 A1 | 3/2017 | Sheretov |
| 2017/0208033 A1 | 7/2017 | Roskind |
| 2018/0034824 A1 * | 2/2018 | Maycotte ............ H04L 67/1095 |
| 2018/0074747 A1 * | 3/2018 | Hasegawa ............ G06F 3/0631 |
| 2018/0131726 A1 | 5/2018 | Arumugam et al. |
| 2018/0131727 A1 | 5/2018 | Arumugam et al. |

OTHER PUBLICATIONS

PCT International Search Report and Written Opinion in International Application No. PCT/US2018/040100, dated Dec. 28, 2018, 11 pages.

Naik et al., 'File System Extended Attributes in NFSv4', dated Dec. 2017, 28 pages.

International Application No. PCT/US2016/054107, Notification of Transmittal of the International Search Report and the Written Opinion of the International Searching Authority, dated Jan. 9, 2017, 13 pages.

Extended European Search Report in European Application No. 16852450.2, dated Jul. 3, 2018, 8 pages.

International Application No. PCT/US2016/065853, Notification of Transmittal of the International Search Report and the Written Opinion of the International Searching Authority, dated Mar. 24, 2017, 14 pages.

\* cited by examiner

ACCESS POLICIES BASED ON HDFS EXTENDED ATTRIBUTES

BACKGROUND

Apache® Hadoop® is a system configured to store and process data using a distributed computing framework. In Apache Hadoop, files can be stored in a Hadoop Distributed File System (HDFS). The HDFS is a distributed file system that can be deployed on multiple off-the-shelf computers. The computers are designated as nodes organized in one or more clusters. The nodes in an HDFS cluster include a name node and multiple data nodes. The data nodes are configured to serve read and write requests from clients of the HDFS cluster. The name node is configured to manage the cluster, including controls access to the files on the data nodes by the clients.

A node of the HDFS designated as a NameNode can store extended attributes (xattrs). The extended attributes include user-defined metadata associated with a file or directory. Unlike other system-level metadata such as system-level file access permissions, creation time, or modification time, extended attributes are not interpreted by the operating system and are instead used by applications to store additional information about the files or directories.

SUMMARY

In general, this specification relates to data security and access control.

Systems, computer program products and methods implementing access control on a distributed file system are described. A policy engine enforces one or more policies to access a data item stored in the distributed file system by utilizing non-system extended attributes of the data item. The policy engine receives, from a client device, a request to access the data item. The policy engine determines a policy that is specific to a user for access the data item. The policy specifies one or more conditions for accessing the data item. The one or more conditions are stored in one or more extended attributes. The one or more extended attributes are associated with the data item in the distributed file system. The policy determines whether to grant the request to access the data item according to values of the one or more extended attributes.

Particular embodiments of the subject matter described in this specification can be implemented to realize one or more of the following example advantages. Conventionally, accesses to a file or directory is controlled by system attributes, e.g., the rwx attributes in a UNIX-like system. The system attributes are typically rudimentary, lacking sophisticated conditional control. The disclosed techniques provide more flexibility than system attribute-based access control. The disclosed techniques can specify not only whether a user or a group of users can read, write, or execute a file, but also a time that the user or users can access the file, whether the limitation is recursively applicable to sub-files and subdirectories, whether the access is conditional, what condition must be satisfied, to access a file, what authentication is required to access the file, or any combination of the above. For example, a policy can specify that a user can read file A only within X hours after the user edited file B, only during weekdays, and only using computers having certain security settings. These parameters of the policy can be stored as extended attributes in an HDFS. Accordingly, the policy can be more sophisticated than conventional techniques that rely on system-level attributes. In addition, implementing the policy using extended attributes can have less overhead and can be less complex than implementing a full-scale conventional access control system.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

Figure 1:
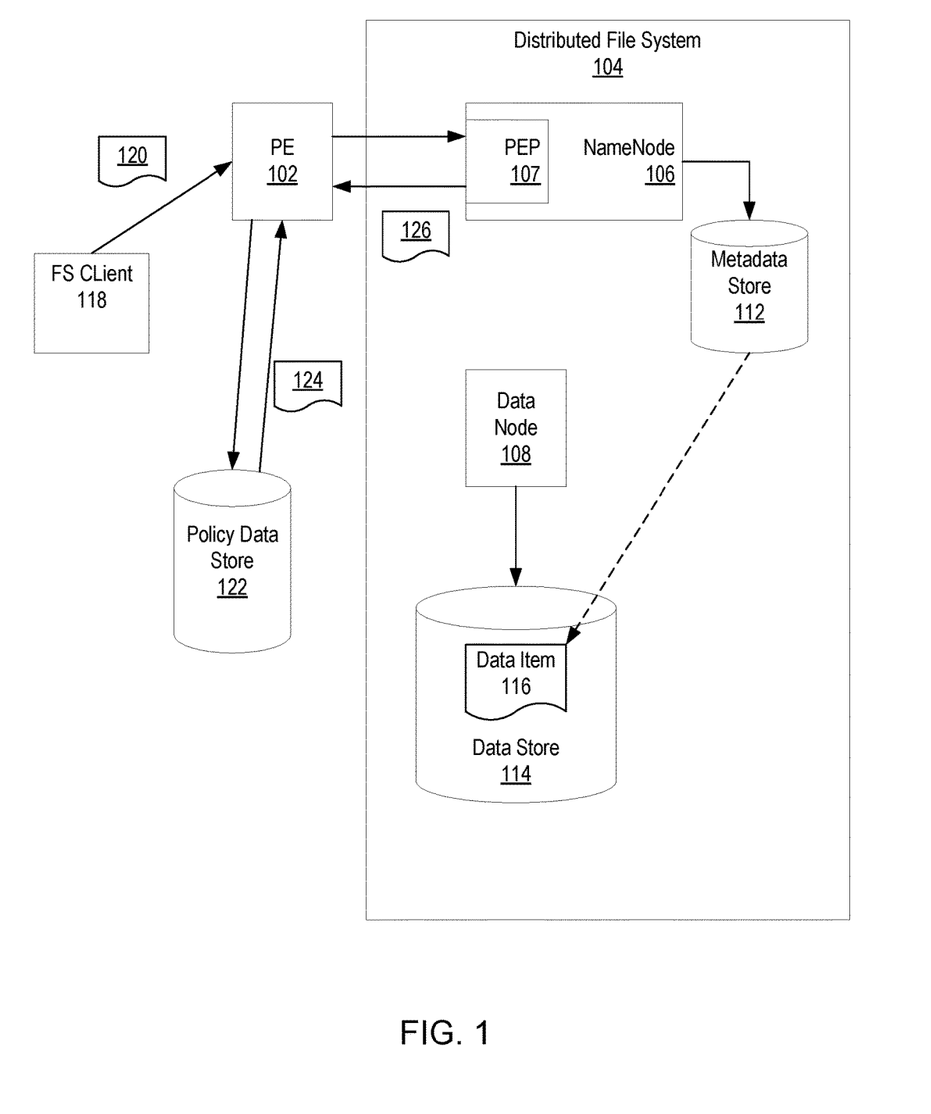
FIG. 1 is a block diagram illustrating example data access control techniques based on HDFS extended attributes.

FIG. 1 is a block diagram illustrating example data access control techniques based on HDFS extended attributes. A policy engine 102 enforces data access policies for accessing data in a distributed file system 104. The policy engine 102 includes one or more computers configured to receive a request, e.g., a query to access a data item, from an application. The policy engine 102 parses the request according to one or more policies available to a user. The policy engine 102 can then determine, based on one or more policies, whether a request to access a data item in the distributed file system 104 is to be granted or denied. The policy engine 102 makes the determination based on various factors as specified in the one or more policies. The factors can include, for example, an identity of a requester, e.g., a user name of user issuing the request; a time of access; and a type of access, e.g., read, write, or execute. The factors can include other configurable conditions.

The distributed file system 104 can be any distributed system that supports user-definable extended attributes, e.g., an HDFS. The distributed file system 104 includes multiple computers managing data stores. The computers are designated as nodes organized in one or more clusters. A cluster in the distributed file system 104 includes a NameNode 106, and at least one data node 108. The NameNode 106 can include a policy enforcement point (PEP) 107. The PEP 107 is a component of the NameNode 106 configured to enforce the decisions of the policy engine 102. The PEP 107 is configured to consult the policy engine 102 for the decisions. In the example shown, the PEP 107 is embedded in the NameNode 106. In various implementations, the PEP 107 can be fronting the NameNode 106, e.g., implemented between the NameNode 106 and the policy engine 102. The PEP 107 and the policy engine 102 can be implemented as two separate entities in the example shown, or be merged into a single entity, e.g., implemented on a dedicated server, or on the NameNode 106.

The NameNode 106 is associated with a metadata store 112 that stores one or more parameters for extended attributes for data items. The parameters can specify, for example, whether extended attributes are enabled, number of extended attributes per data item, and maximum size of an extended attribute. The data node 108 is associated with a data store 114. The data store 114 stores an example data item 116. The data item 116 can be an inode in a file system. The inode can include a file or a directory. The data item 116 can be associated with one or more extended attributes. Each extended attribute includes a name:value pair. A name in the name:value pair identifies the extended attribute. The value of the name:value pair can be a user specified number, string, or structured (e.g., tagged) data item.

A file system client 118 submits a request 120 to access the data item 116. The file system client 118 can include one or more computers running various applications that use the data item 116. The request 120 is associated with a user identity of a requester, e.g., user Alice.

The policy engine 102 receives the request 120. The policy engine 102 can authenticate and authorize the identity associated with the request 120. In response to successful authentication and authorization, the policy engine 102 can determine a policy associated with the requester. A policy includes a set of one or more rules that specify what data item or data items a user, e.g., the user Alice, can access, at what time, and in what way.

The policy engine 102 queries a policy data store 122 using the user identifier, e.g., Alice, associated with the request 120. The policy data store 122 includes a non-transitory storage device, e.g., a hard disk. The policy data store 122 returns a policy 124 associated with the user identifier.

The policy 124 can specify that at least a portion of the one or more rules governing access of the data item 116 are stored in the distributed file system 104 as extended attributes of the data item 116. The policy engine 102 parses the policy 124 and determines the names of extended attributes used in the policy 124. The policy engine 102 then queries the distributed file system 104 using the names of the extended attributes. The NameNode 106 can receive the query, and provide the values 126 of the extended attributes corresponding to the names to the policy engine 102. The values 126 can indicate conditions under which the requester, e.g., user Alice, can access the data item 116, and in what way, e.g., read, write, or execute.

The policy engine 102 receives the values 126 of the extended attributes. The policy engine 102 then determines, based on the values 126, whether the request 120 satisfies the conditions specified in the values 126. For example, the values 126 of the extended attributes can indicate a first time period in which the requester has read access to the data item 116, a second time period in which the requester has write access to the data item 116, and a third time period in which the requester has execution access to the data item 116. The first, second, and third time periods may or may not overlap with one another. The policy engine 102 can determine whether the request 120 is a request for read, write, or execution, determine a request time, and determine whether the request time satisfies a corresponding time period.

In response to determining that all conditions are satisfied, the policy engine 102 forwards the request 120 to the distributed file system 104. In response to determine that the at least one condition is not satisfied, the policy engine 102 can block the request 120 and return an error message to the file system client 118.

In some implementations, the values 126 of the extended attributes can specify that a portion of the data item 116 is to be blocked, e.g., redacted, for the user under certain conditions. The policy engine 102, upon forwarding the request 120 to the distributed file system 104, can intercept a response to the request 120 that the distributed file system 104 provides to the file system client 118. The policy engine 102 can redact the response, e.g., by masking certain data fields, e.g., personal identification numbers, credit card numbers, or birth dates, as specified in the values 126 of the extended attributes. The policy engine 102 can then submit the redacted response to the file system client 118.

Figure 2:
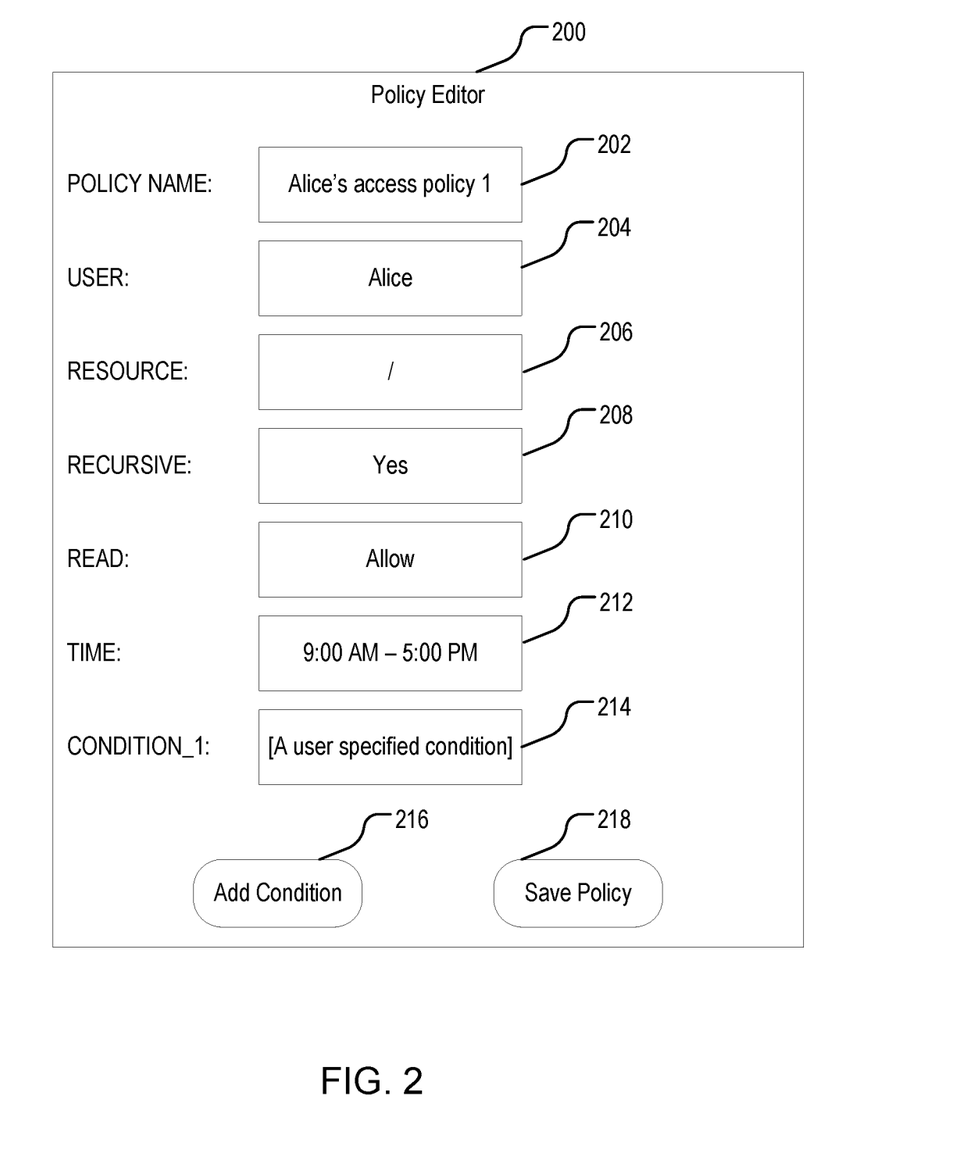
FIG. 2 illustrates an example user interface for editing a policy that is based on HDFS extended attributes.

FIG. 2 illustrates an example user interface 200 for editing a policy that is based on HDFS extended attributes. The user interface 200 can be provided by the policy engine 102 of FIG. 1 to an administrator device, e.g., one or more computers used by an administrator of the policy engine 102. The administrator can create, edit, save and delete a policy using the user interface 200.

The user interface 200 includes a policy name field 202. The policy name field 202 is a user interface item configured to receive a user input specifying a policy name and to display the policy name. The policy engine 102 can store the policy name in the policy data store 122 of FIG. 1.

The user interface 200 includes a user name field 204. The user name field 204 is a user interface item configured to receive a user input specifying a user name and to display the user name. The user name indicates a user to which the policy being edited is associated with. User interface would also accept group name for which the policy applies. The policy engine 102 can store the user name in the policy data store 122, in the distributed file system 104 of FIG. 1, or both. If the policy engine 102 stores the user name in the distributed file system 104, the policy engine 102 can store the user name as an extended attribute of a data item, for example, as a name:value pair, e.g., user:Alice.

The user interface 200 includes a resource field 206. The resource field 206 is a user interface item configured to receive a user input specifying a resource and to display the resource. The resource can include one or more data items stored in the distributed file system 104. The policy engine 102 can provide one or more identifiers of the one or more data items to the distributed file system 104. The distributed file system 104 can associate one or more extended attributes, e.g., other fields configured through the user interface 200, with each of the one or more resources. In the example shown, the resource specified is a root ("/") directory in the distributed file system 104. This directory is an absolute path. In various implementations, the resource can be a directory corresponding to a relative path. The resource can be a file. The association of the extended attributes and the resource can be location agnostic, where when the resource moves, the permission moves with the resource.

The user interface 200 includes a recursion field 208. The recursion field 208 is a user interface item configured to receive a user input specifying whether the policy is applied recursively, for all items specified in the resource and sub-items, e.g., content in subdirectories. The value can be yes or no. In the example shown, the recursion field 208 indicates that the policy is applicable to all subdirectories of the root ("/") directory in the distributed file system 104. Accordingly, the extended attribute is applicable to all subdirectories and files in the subdirectories of the specific root directory.

The user interface 200 includes a permission field 210. The permission field 210 is a user interface item configured to receive a user input specifying a permission corresponding to an action and to display the permission. The policy engine 102 can store the permission in the distributed file system 104 of FIG. 1 as an extended attribute of a data item, for example, as a name:value pair, e.g., read:yes, where the action is the name and the permission is the value. In FIG. 2, the example of the action is "read." In various implementations, multiple actions, including read, write, execute and user customizable actions can be specified. For example, a customized action can be opening a number of files permissible in a directory concurrently, writing a series of files in a particular directory sequentially in a specified order, or authenticating an IP addresses from where a command to execute a data item is issued.

The user interface 200 includes a time field 212. The time field 212 is a user interface item configured to receive a user input specifying a time period that a specific access permission is applicable to the resource. The policy engine 102 can store the time period in the distributed file system 104 of FIG. 1 as an extended attribute of a data item, for example, as a name:value pair, e.g., time: [start time]-[end time].

The user interface 200 includes a condition field 214. The condition field 214 is a user interface item configured to receive a user input specifying a user-defined condition for a specific access permission. The condition can include, for example, whether a particular file exists, whether a particular directory has been accessed by a particular user at a particular time, whether a particular application program has executed, or whether a request to access a file is issued from a particular geographic location. The policy engine 102 can store the condition in the distributed file system 104 of FIG. 1 as one or more extended attributes of a data item, for example, as a name:value pair, e.g., condition:[string].

The user interface 200 includes an add condition button 216. The add condition button 216 is a user interface item configured to receive a user input to add a new condition to a particular resource. Each condition can correspond to a respective extended attribute. The user interface 200 includes a save policy button 218. The save policy button 218 is a user interface item configured to receive a user input to save the policy to a policy data store, e.g., the policy data store 122 of FIG. 1.

Figure 3:
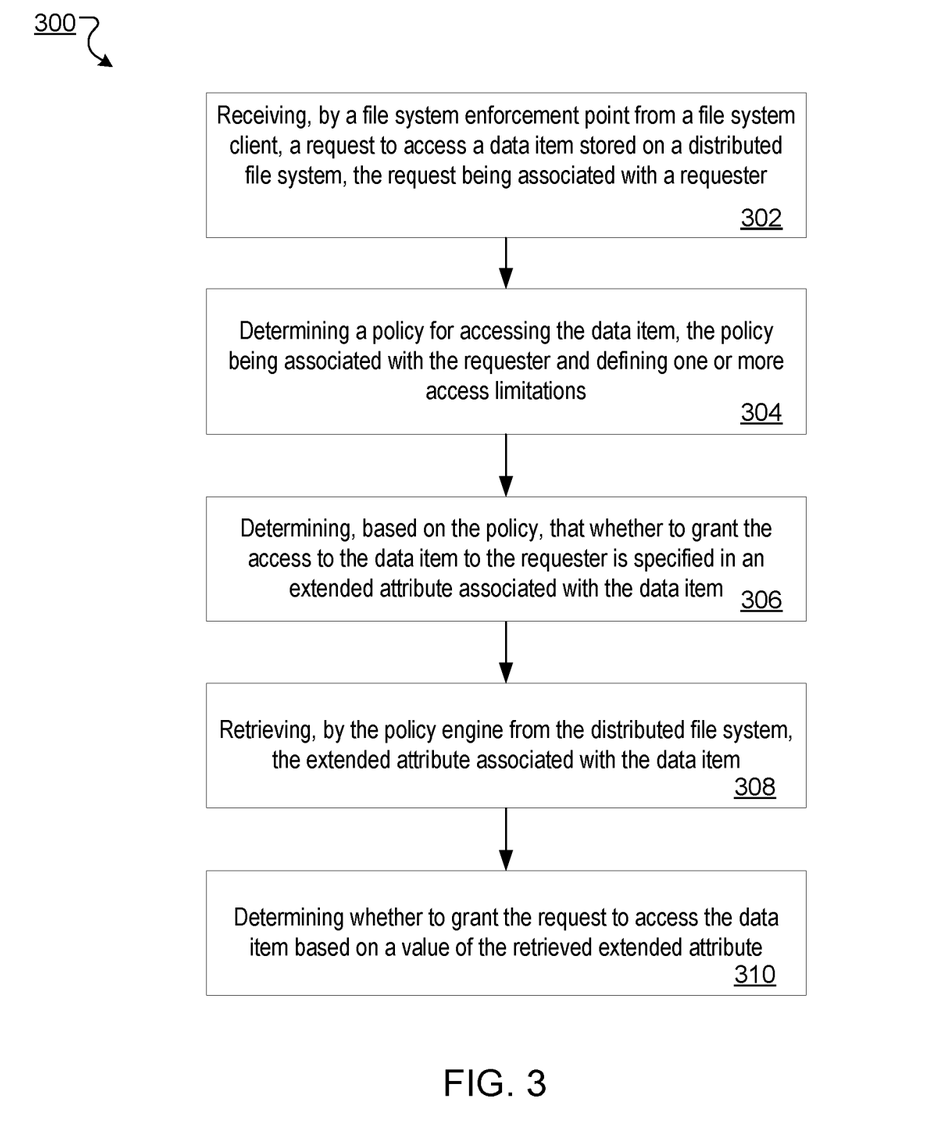
FIG. 3 is a flowchart of an example process of data access control techniques based on HDFS extended attributes.

FIG. 3 is a flowchart of an example process 300 of data access control techniques based on HDFS extended attributes. The process 300 can be performed by a system including one or more computers, e.g., the policy engine 102 of FIG. 1.

The system receives (302) a request from a client device, e.g., the file system client 118 of FIG. 1. The request is for accessing a data item stored on a distributed file system, e.g., the distributed file system 104 of FIG. 1. The request is associated with a declared identity, e.g., a user name of a requester. The distributed file system can be an HDFS.

The system determines (304) a policy for accessing the data item. The policy is associated with the requester. The policy defines one or more access limitations or privileges. The system can determine the policy by querying a policy data store.

The system determines (306), based on the policy, that whether to grant the access to the data item to the requester is specified in an extended attribute associated with the data item. The extended attribute is a user-defined attribute of the data item that is different from a system attribute. The extended attribute is associated with the data item by the distributed file system. The extended attribute can be an xattr attribute of an RDFS.

In some implementations, the policy can specify that whether to grant the access to the data item is based on a time window and an access type specified in the extended attribute. For example, the policy can specify that a user, e.g. user Alice, can read a file from midnight to 9 am and from 5 pm to midnight, can write to the file from 9 am to 5 pm, and can execute the file from 3 pm to 6 pm. The specification can be stored as one or more extended attributes of the file.

In some implementations, the extended attribute specifies a classification of the data item, e.g., whether a file is a sales department file, a marketing department file, or a company-wide circulation file. The policy specifies classes of data items that the requester is allowed to access, e.g., user Alice can access marketing department files and company-wide circulation files. Determining whether to grant the request to access the data item is based on determining whether the classification of the data item matches the specified classes.

The system retrieves (308), from the distributed file system, the extended attribute associated with the data item. The data item can be a directory storing one or more files, one or more subdirectories, or both. The extended attribute can specify whether the access to the data item is granted recursively to the one or more files, one or more subdirectories, or both, and under what condition or conditions.

The system determines (310) whether to grant the request to access the data item based on a value of the retrieved extended attribute. The value of the name:value pair of the extended attribute is set using an HDFS set attribute command by a policy administrator, in the case of HDFS file system. The value of the name:value pair is retrieved using an HDFS get attribute command by the policy engine. Upon determining that access to the data item is granted, the system forwards the request to the HDFS. Upon determining that the access is denied, the system blocks the request, and provides an error message to the client device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:

receiving, by a policy engine from a client device, a request to access a data item stored on a distributed file system, the request being associated with a requester;

determining a policy for accessing the data item, the policy being associated with the requester and defining one or more access limitations;

determining, based on the policy, that whether to grant the access to the data item to the requester is specified in an extended attribute associated with the data item, the extended attribute being an administrator-defined attribute of the data item that is different from a system attribute and being stored in the distributed file system determining a name of the extended attribute based on the policy;

retrieving, by the policy engine from the distributed file system, the extended attribute using the name of the extended attribute; and determining whether to grant the request to access the data item based on a value of the retrieved extended attribute, wherein the policy engine includes one or more computer processors.

2. The method of claim 1, wherein the policy specifies that whether to grant the access to the data item is based on a time window and an access type specified in the extended attribute.

3. The method of claim 1, wherein:

the extended attribute specifies a classification of the data item, the policy specifies classes of data items that the requester is allowed to access, and determining whether to grant the request to access the data item is based on determining whether the classification of the data item matches the specified classes.

4. The method of claim 1, wherein:

the data item is a directory storing one or more files, one or more subdirectories, or both, and the extended attribute specifies whether the access to the data item is granted recursively to the one or more files, to one or more subdirectories, or both.

5. The method of claim 1, wherein the distributed file system is a Hadoop Distributed File System (HDFS), and the extended attribute is an xattr attribute of the HDFS.

6. The method of claim 5, wherein:

the extended attribute includes a name:value pair, the name of the name:value pair identifies the extended attribute, the value of the name:value pair is set using an HDFS set attribute command by a policy engine, and the value of the name:value pair is retrieved using an HDFS get attribute command by the policy engine.

7. The method of claim 5, comprising:

upon determining that access to the data item is granted, forwarding, by the policy engine, the request to the HDFS.

8. The method of claim 5, comprising:

upon determining that access to the data item is not granted, blocking the request and providing, by the policy engine, an error message to the client device.

9. A non-transitory computer readable storage medium storing instructions executable by one or more processors and upon such execution cause the one or more processors to perform operations comprising:

receiving, by a policy engine from a client device, a request to access a data item stored on a distributed file system, the request being associated with a requester;

determining a policy for accessing the data item, the policy being associated with the requester and defining one or more access limitations;

determining, based on the policy, that whether to grant the access to the data item to the requester is specified in an extended attribute associated with the data item, the extended attribute being an administrator-defined attribute of the data item that is different from a system attribute and being stored in the distributed file system determining a name of the extended attribute based on the policy;

retrieving, by the policy engine from the distributed file system, the extended attribute using the name of the extended attribute; and determining whether to grant the request to access the data item based on a value of the retrieved extended attribute, wherein the policy engine includes one or more computer processors.

10. The non-transitory computer readable storage medium of claim 9, wherein the policy specifies that whether to grant the access to the data item is based on a time window and an access type specified in the extended attribute.

11. The non-transitory computer readable storage medium of claim 9, wherein:

the extended attribute specifies a classification of the data item, the policy specifies classes of data items that the requester is allowed to access, and determining whether to grant the request to access the data item is based on determining whether the classification of the data item matches the specified classes.

12. The non-transitory computer readable storage medium of claim 9, wherein:

the data item is a directory storing one or more files, one or more subdirectories, or both, and the extended attribute specifies whether the access to the data item is granted recursively to the one or more files, one or more subdirectories, or both.

13. The non-transitory computer readable storage medium of claim 9, wherein the distributed file system is a Hadoop Distributed File System (HDFS), and the extended attribute is an xattr attribute of the HDFS.

14. The non-transitory computer readable storage medium of claim 13, wherein:

the extended attribute includes a name:value pair, the name of the name:value pair identifies the extended attribute, the value of the name:value pair is set using an HDFS set attribute command by a policy engine, and the value of the name:value pair is retrieved using an HDFS get attribute command by the policy engine.

15. A system comprising:

one or more computers and one or more storage devices on which are stored instructions that are operable, when executed by the one or more computers, to cause the one or more computers to perform operations comprising:

receiving, by a policy engine from a client device, a request to access a data item stored on a distributed file system, the request being associated with a requester;

determining a policy for accessing the data item, the policy being associated with the requester and defining one or more access limitations;

determining, based on the policy, that whether to grant the access to the data item to the requester is specified in an extended attribute associated with the data item, the extended attribute being an administrator-defined attribute of the data item that is different from a system attribute and being stored in the distributed file system determining a name of the extended attribute based on the policy;

retrieving, by the policy engine from the distributed file system, the extended attribute using the name of the extended attribute; and determining whether to grant the request to access the data item based on a value of the retrieved extended attribute, wherein the policy engine includes one or more computer processors.

16. The system of claim 15, wherein the policy specifies that whether to grant the access to the data item is based on a time window and an access type specified in the extended attribute.

17. The system of claim 15, wherein:

the extended attribute specifies a classification of the data item, the policy specifies classes of data items that the requester is allowed to access, and determining whether to grant the request to access the data item is based on determining whether the classification of the data item matches the specified classes.

18. The system of claim 15, wherein:

the data item is a directory storing one or more files, one or more subdirectories, or both, and the extended attribute specifies whether the access to the data item is granted recursively to the one or more files, one or more subdirectories, or both.

19. The system of claim 15, wherein the distributed file system is a Hadoop Distributed File System (HDFS), and the extended attribute is an xattr attribute of the HDFS.

20. The system of claim 19, comprising:

upon determining that access to the data item is granted, forwarding, by the policy engine, the request to the HDFS.

* * * * *